Patented Dec. 27, 1927.

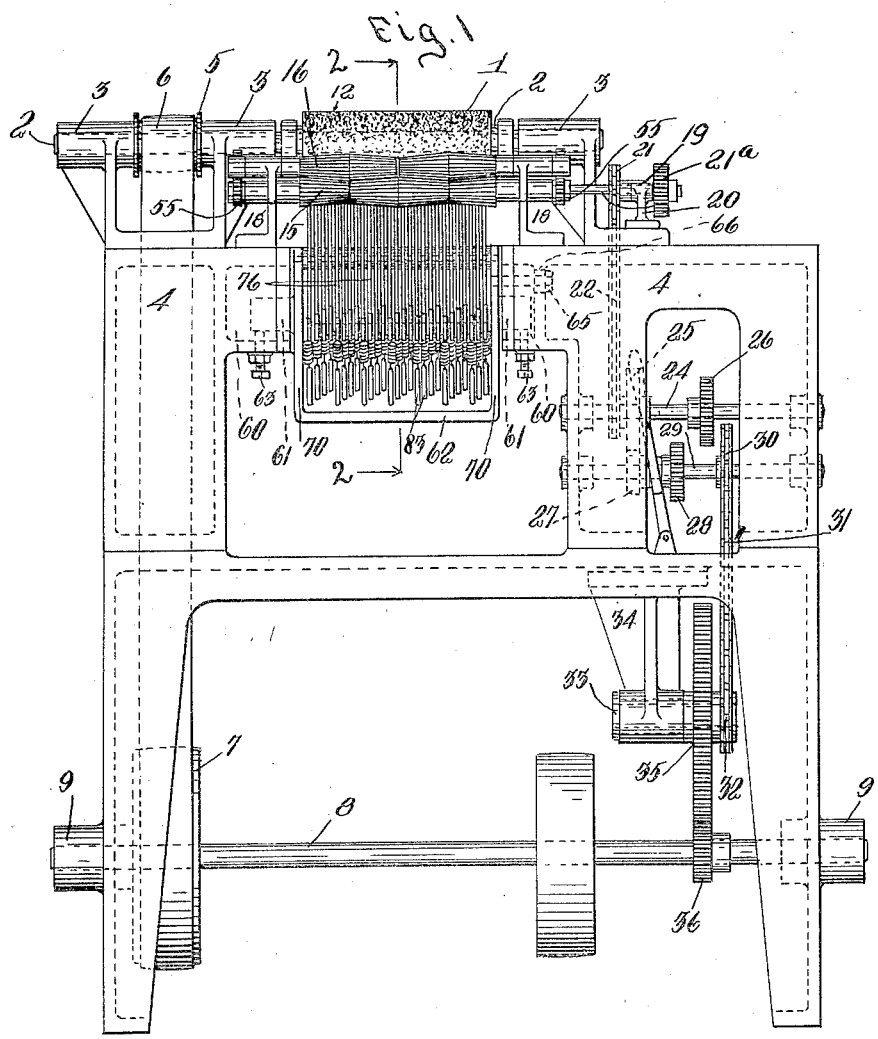

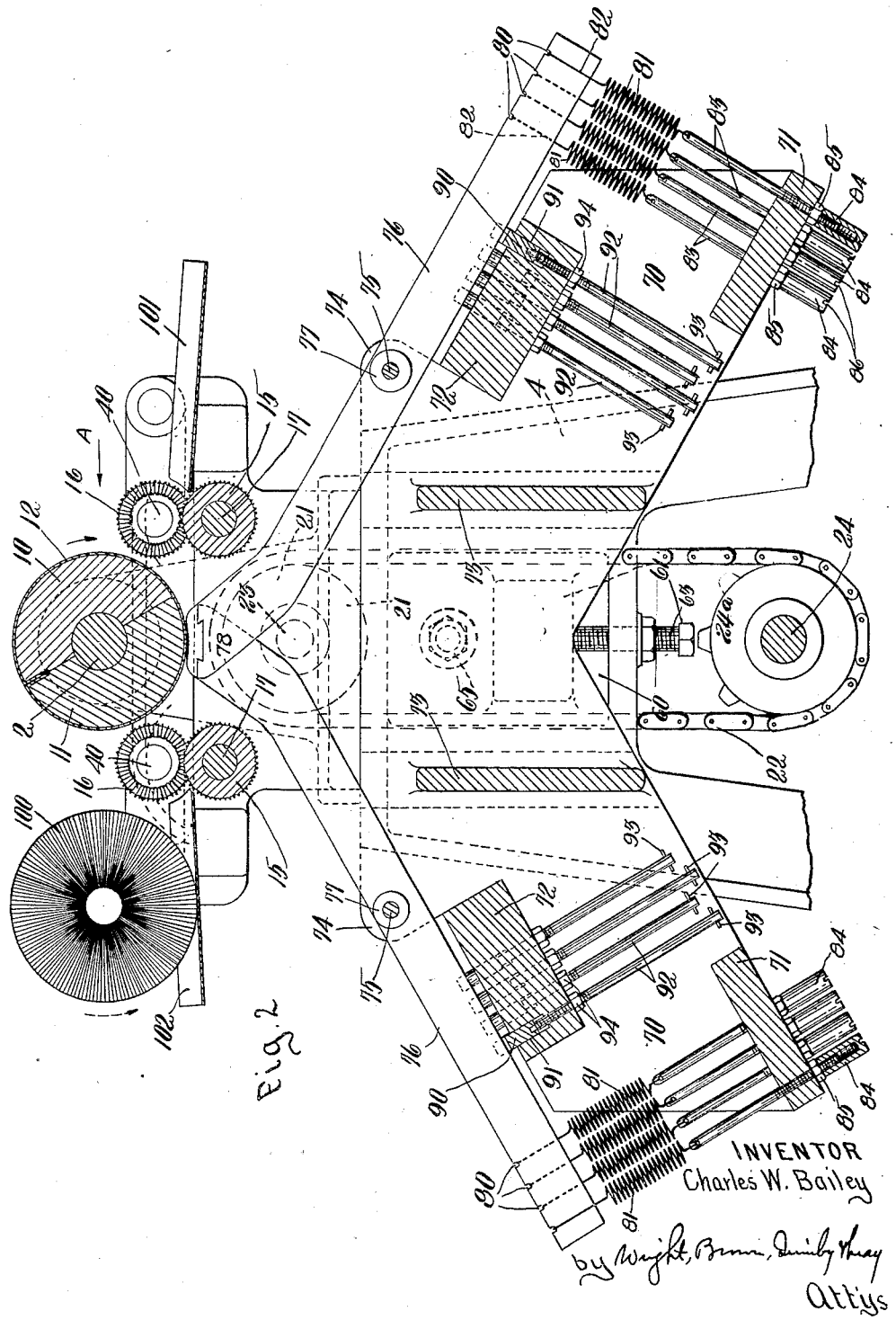

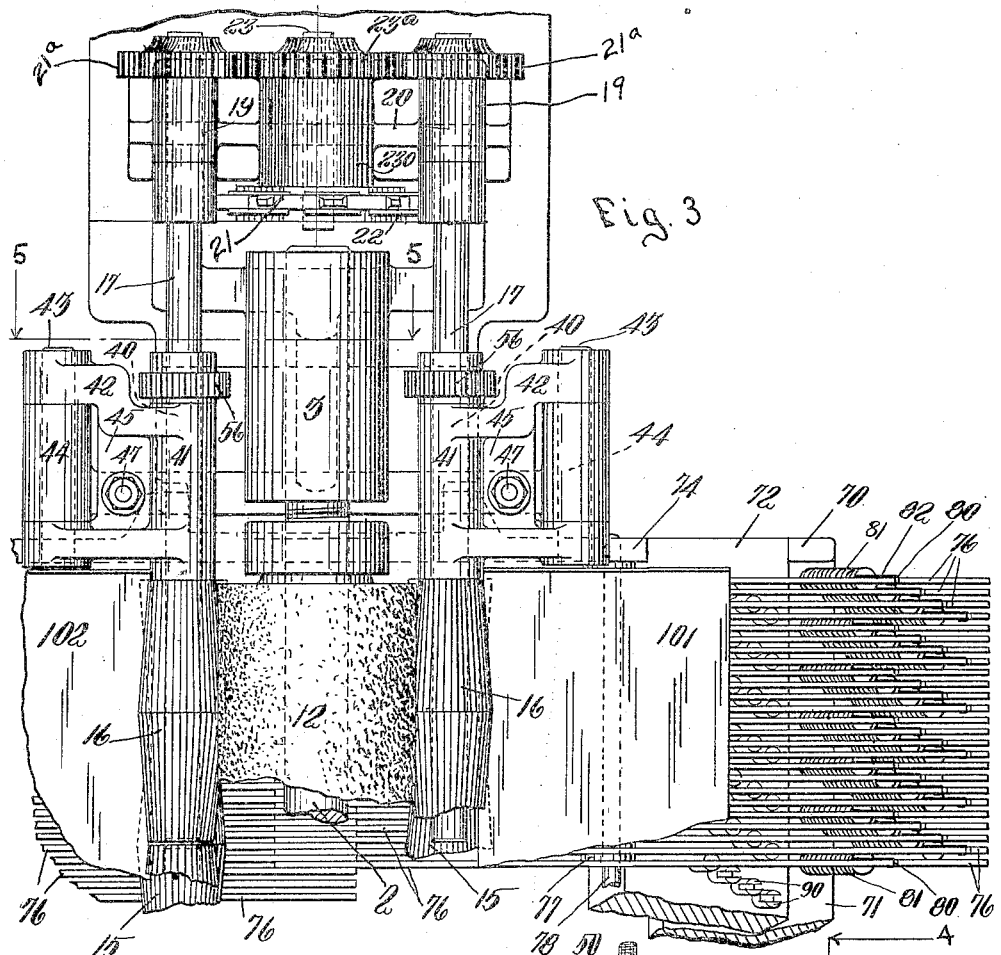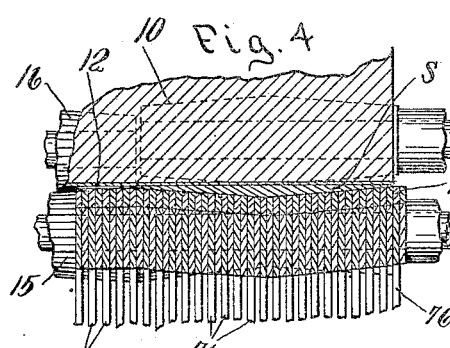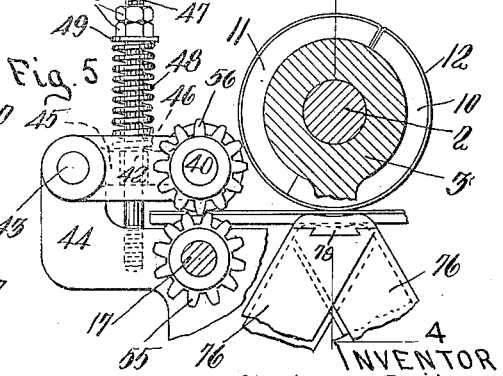

1,653,940

UNITED STATES PATENT OFFICE.

CHARLES W. BAILEY, OF LYNN, MASSACHUSETTS, ASSIGNOR TO JOHN HAMMOND STEWART, OF LYNNFIELD, MASSACHUSETTS.

BUFFING MACHINE.

Application filed March 31, 1922. Serial No. 548,329.

This invention relates to buffing machines and is particularly intended for buffing off the skived faces of counter and toe stiffener members, or the like. As skived these members are thinner at their edges than centrally. This invention provides mechanism for feeding the skived blanks to a buffing wheel or roll which may, if desired, be so deformed that the surface to be buffed is brought into a plane so that it may properly be acted upon by a cylindrical buffing roll. Means are also provided for pressing the work against the buffing roll in the proper position.

For a more complete understanding of this invention reference may be had to the accompanying drawings in which Figure 1 is an end view of the machine.

Figure 2 is a section drawn to a large scale through the upper portion of the machine on line 2—2 of Figure 1.

Figure 3 is a fragmentary plan.

Figure 4 is a fragmentary vertical section on line 4—4 of Figure 5.

Figure 5 is a fragmentary section on line 5—5 of Figure 3.

Figure 6 is a transverse section through the blank to be buffed.

This machine comprises a buffing roll indicated at 1 which is fixed to a shaft 2 journaled in bearings 3 which are supported on the upper face of the machine bed 4. The roll 1 is rotated by means of a belt pulley 5 fixed to shaft 2 between two of the bearings 3, and over which passes a belt 6 which leads about a pulley 7 on a main power shaft 8 journaled in bearings 9 near the base of the machine. The buffing roll 1 is of any suitable construction, as herein shown it being composed of two semicylindrical sections 10 and 11 surrounding the shaft 2 and having a covering 12 of abradant material.

In order to feed the blanks or other work to be buffed to this roll, a pair of spaced feeding mechanisms, between which the roll is supported, are herein indicated. Each of these mechanisms comprises upper and lower fluted feed rollers, the lower rollers being indicated at 15 and the upper rollers at 16. The lower rollers 15 are fixed to shafts 17 journaled in brackets 18 extending upward from the machine bed 4. At one end these shafts are extended beyond the bearings 18 into bearings 19 in a bracket 20. Outwardly of the bearings 19, the shafts 17 have fixed thereto gears 21$^a$, both of which mesh with an intermediate gear 23$^a$ carried by a stub shaft 23, which is journalled in a bearing 230 centrally disposed between the bearings 19. Inwardly of the bearing 23O, shaft 23 has fixed thereto a sprocket wheel 21 over which passes a chain 22 which extends downwardly within the machine base and about a sprocket wheel 24$^a$ on a jack shaft 24. This jack shaft has fixed thereon a pair of gears 25 and 26 with which may be meshed gears 27 and 28 slidable axially of a shaft 29, this mechanism serving as a two speed selective drive between the shaft 29 and the jack shaft 24. The shaft 29 has fixed thereto a sprocket wheel 30 over which passes a chain 31 leading to a sprocket wheel 32 mounted on a stub shaft 33 carried by a bracket 34. This sprocket wheel 32 is fixed to rotate with a gear 35 meshing with a pinion 36 on the drive shaft 8. When either of the gears 27 or 28 is in mesh with either gear 25 or 26, rotation of the shaft 8 imparts rotation to the shaft 17 and to the lower feed rollers.

The upper feed rolls 16 are fixed to stub axles 40 journaled in sleeves 41 forming portions of lever members 42 fulcrumed on pins 43 carried by upstanding ears 44 supported from the bed 4. Each lever member 42 has a central web portion 45 which is perforated at 46 for the loose reception of a stud 47 threaded at its lower end in a portion of the ear 44. In order to urge the lever 42 downwardly a spring 48 surrounds the stud 47 and bears at its lower end against the upper face of the web 45 and at its upper end against the under face of a washer 49 held in place by lock nuts 50 threaded on the upper end of the stud. By this means the upper and lower feed rollers are urged toward each other. Outwardly of each bearing 18, each shaft 17 has fixed thereto pinions 55 with which mesh similar pinions 56 carried by the shafts 40, whereby rotation imparted to the shafts 17 to rotate the lower rollers rotates the upper rollers in the reverse direction.

In order that the upper face of the skived blank which it is designed shall be buffed in the present machine shall be presented properly to the buffing roll, the feed rollers may be designed to present the skived surface in a plane which may be operated upon by a buffing roll. For this purpose the lower rollers are tapered to permit the thicker central portion of each blank to be depressed below the side edges thereof so that the upper face may be made to take a plane form.

In the machine as shown the shafts 17 are of sufficient length to provide for two lower rollers in alinement so that two blanks may be operated upon simultaneously side by side. Each lower roller therefore, is larger at its ends and tapers to a smaller diameter at its center. If desired the two lower rollers in alinement with each other might be made integral as a single roller having two portions of small diameter, a central enlarged portion and enlarged end portions. In order to present the centrally thickened portion of the blanks into the smaller portions of the lower rollers the upper rollers 16 are formed complemental to the lower rollers, that is, each roller 16 is of larger diameter at its central portion and of reduced diameter at its ends, this being clearly indicated in Figure 1. As the blanks are fed beneath the buffing roller, the top faces are held in a plane by engagement between the spaced pairs of feed rollers. The larger portion of each roller 16 engages the thicker central portion of the blank so localizing the pressure to bend it to conform to the contour of the lower roller. Due to the elasticity of the blanks their thin edges have no tendency to rise from the lower roller to engage the smaller portions of the rollers 16, and as their lower faces are pressed into contact with the lower rollers their upper faces remain substantially in one plane.

In order that the work may be held up against the buffing roll, while it is being fed, the following mechanism is provided. The machine bed 4, at opposite sides directly beneath the ends of the buffing roll, is formed with a pair of alined vertical guideways 60 in which are supported a pair of lugs 61 extending laterally from opposite sides of a yoke frame 62. This yoke frame may be adjusted vertically with relation to the machine bed 4 by means of adjusting screws 63 threaded through the bases of the guide members and impinging against the lower faces of the lugs 61. In order to fasten the yoke frame in adjusted position, a bolt 65 passes through a slot 66 in the inner wall of one of the guideways and is threaded at its inner end in the yoke 62. By tightening this bolt the yoke frame may be clamped securely in position. The yoke frame comprises a pair of end members 70 connected by spaced lower cross frame members 71, upper cross frame members 72, and vertical webs 73. The end members 70, above the frame member 72, have upwardly projecting ears 74 for the reception of pivot bars 75. On each pivot bar is positioned a series of fingers or levers 76 which are spaced apart along the pivot bars by means of washers 77. The inner ends of these fingers extend toward each other and inclined upwardly beneath the buffing roll 1, fingers pivoted on the opposite rods 75 being positioned alternately along the length of the buffing roll. The upper end of each finger preferably carries a removable wear piece 78. The wear pieces of the several fingers 76, projecting theretoward from oppositely inclined directions alternately, form together a surface for receiving the material to be buffed and pressing it against the periphery of the buffing roll. As the thickness of the material varies lengthwise of the roll, provision is made for individually adjusting the position of each of the wear plates 78 so as to conform to the material and press it against the buffing roll in the desired relation. For this purpose the rear end of each lever or finger 76 is provided with a notch 80, the notches of the adjacent fingers being staggered to permit room for the positioning of tension members shown at 81 each having a loop or hook portion 82 seated in one of the notches 80 to draw the outer end of the finger downwardly to press its upper end toward the buffing roll. The lower end of each spring 81 has fixed thereto an adjusting rod 83 which passes through a cross frame member 71 and is threaded into an adjusting nut 84 at its outer end. A lock nut 85 is also threaded on each bar 83 between the nut 84 and the cross bar 71. Each nut 84 is preferably provided with a screw driver slot 86 at its outer end, by which it may be turned, for the purpose of adjusting the position of the rod 83 and consequently the tension of its spring 81.

It is also desirable to limit the possible movement of each block 78 toward the buffing roll in conformity with the thickness of the material so that the buffing may be properly effected and pressure applied only where it is desired to remove stock. For this purpose, beneath each lever or finger 76 and between the pivot rod 75 and its spring 81, is positioned an adjustable abutment block 90. Each block is slotted at its outer end to form a channel to receive the edge of a finger 76 and is slidable within an opening 91 in a cross frame member 72. These blocks are also staggered to permit the fingers 76 to be positioned closely adjacent each other without interference. Each of these blocks is recessed in its lower end at 91 to receive the reduced extremity of an adjusting rod 92 which is threaded through the member 72 and projects within the rear end of the recess 91. The outer end of each rod 92 has fixed therein a cross pin 93 by which it may be turned to adjust it in and out relative to the cross bar 72, and consequently to raise and lower its abutment block 90. A lock nut 94 may be employed to lock each rod 92 in adjusted position. By this means it is seen that the limit to which each wear block 78 may approach the buffing roll is adjustably limited by the setting of the corresponding abutment block so that as the material S feeds through in the direction shown by arrow A in Figure 2, its upper surface, which is to be buffed, is bent into a plane as shown in dotted lines in Figure 6 to present it to the buffing roll, and that the work is held in this position by the wear pieces 78 while it is being buffed.

With some classes of work it is found that the fingers are sufficient to present the work properly to the buffing roll without the necessity of employing conical feed rollers. Cylindrical feed rollers may then be employed in place of the rollers 15 and 16.

The buffing roll is preferably driven in the direction as shown by the arrow in Figure 2 so that the portion in engagement with the work moves in the direction of feed and at a higher speed. This not only aids in feeding the material to the machine but also brushes the dust and material abraded away from the operator feeding the machine. If desired a rotary brush may be positioned as shown in Figure 2 at 100. This brush preferably rotates against the line of feed to move the dust and abraded material away from the work as it is fed from the machine, and preferably both brush and roll throw the waste material toward the opening of a blower chute (not shown) by which it may be removed as in ordinary practice in buffing machines.

If desired chutes or trays for supporting the work as it is fed to and delivered from the machine may be employed as shown at 101 and 102.

Having thus described an embodiment of this invention it should be evident to those skilled in the art that many changes and modifications might be made therein without departing from its spirit or scope as defined by the appended claims.

I claim:

1. In a machine of the class described, a pair of spaced sets of feed rollers, each set comprising cooperating rollers tapered complementally between their ends and centers, a buffing roll positioned between said sets, and means for pressing material being fed by said sets of feed rollers against the periphery of said buffing roll.

2. In a machine of the class described, a buffing roll, a pair of series of fingers, the fingers of one of said series being disposed angularly to the fingers of the other series and the fingers of the two series being arranged in alternation lengthwise of said roll, and means for resiliently urging one end of each finger toward said roll.

3. In a machine of the class described, a buffing roll, a frame vertically adjustable beneath said roll, a pair of relatively angularly disposed series of fingers pivoted to said frame, the upper ends of the fingers of the two series being positioned alternately lengthwise of said roll, and resilient means acting on the opposite ends of said fingers for urging the upper ends thereof toward said roll.

4. In a machine of the class described, a buffing roll, a frame vertically adjustable beneath said roll, a pair of relatively angularly disposed series of fingers pivoted to said frame, the upper ends of the fingers of each series being positioned alternately lengthwise of said roll, resilient means acting on the opposite ends of said fingers for urging the upper ends thereof toward said roll, and individually adjustable abutments for determining the limit of motion of the upper ends of said fingers toward said roll.

5. In a machine of the class described, a buffing roll and a pair of sets of fluted feed rollers, each set comprising complemental rollers each of which is tapered between its center and ends for presenting and feeding work relative to said buffing roll.

6. In a machine of the class described, a pair of spaced sets of feed rollers, the rollers of each set being complementally tapered, and a buffing roll of uniform diameter positioned between said sets of rollers.

7. In a machine of the class described, a pair of spaced rollers each having portions of greater and portions of lesser diameter, means for pressing work of variable thickness against said rollers, the thicker portions thereof engaging the smaller diameter portions of said rollers, whereby one face of the work may assume substantially a plane, and a buffing roll between said spaced rollers and acting on said face.

In testimony whereof I have affixed my signature.

CHARLES W. BAILEY.